Dec. 14, 1937.  B. DE MONTMORENCY  2,102,520
COCKTAIL SHAKER
Filed July 15, 1937
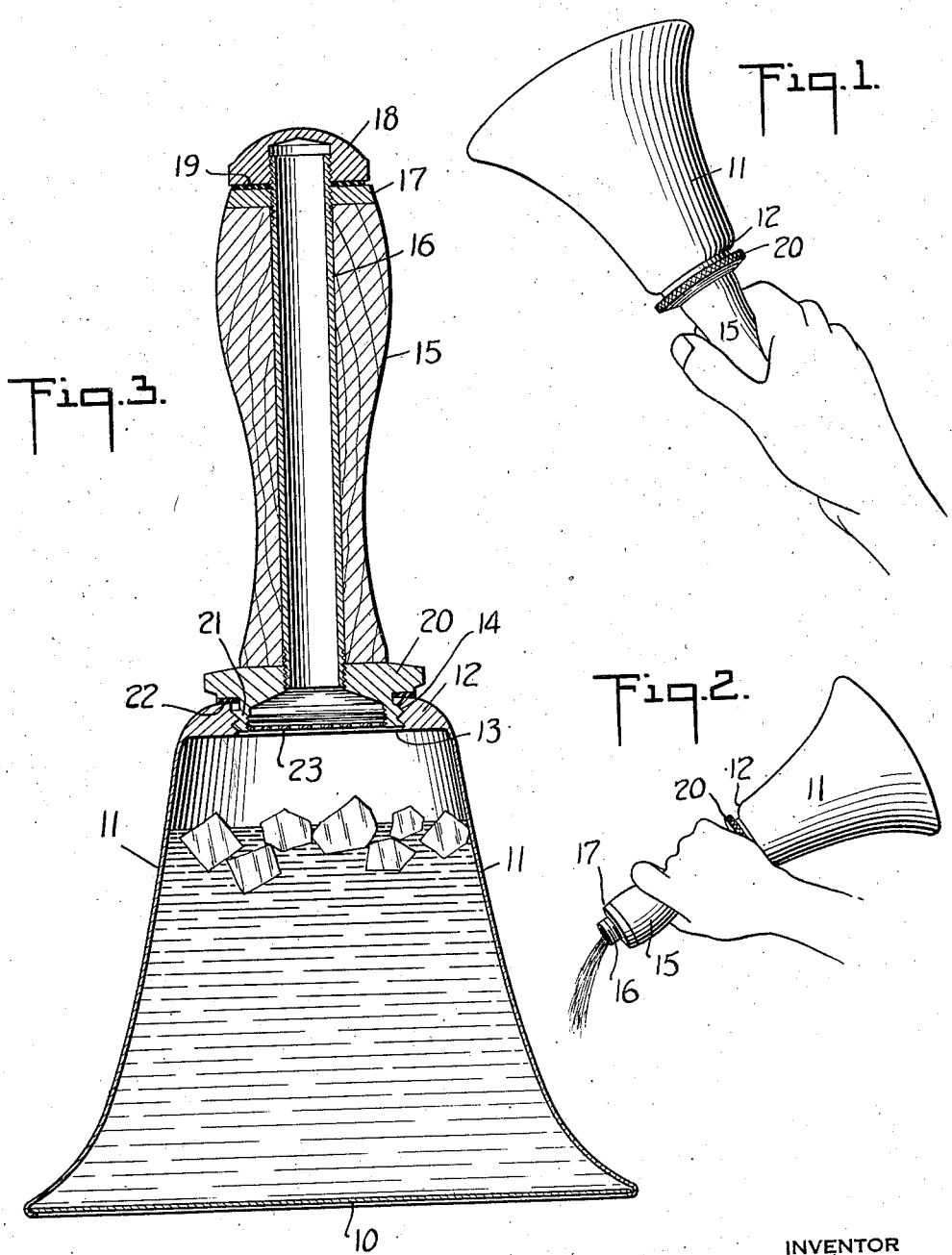
INVENTOR
Bruce de Montmorency
BY
Frederich Breitenfeld
ATTORNEY Patented Dec. 14, 1937

2,102,520

UNITED STATES PATENT OFFICE 2,102,520

COCKTAIL SHAKER

Bruce de Montmorency, Pelham, N. Y., assignor to National Silver Deposit Ware Co., Inc., New York, N. Y., a corporation of New York Application July 15, 1937, Serial No. 153,757

6 Claims. (Cl. 220—1)

My present invention relates generally to mixing devices, and has particular reference to cocktail shakers.

It is a general object of my invention to provide a cocktail shaker of novel shape and configuration, whereby the device is rendered not only uniquely attractive to the eye, but is capable of unusually efficient agitation of the ingredients to be mixed.

Briefly, my invention resides in the provision of a cocktail shaker having the configuration of a town-crier's bell, the body of the bell serving as a container for the ingredients to be mixed, whereby the mixing may be accomplished by grasping the bell handle and swinging the device through the air as though the "bell" were being rung.

By the term "town-crier's bell", as the same is used herein and in the appended claims, I intend to refer to any bell of the type in which the body is relatively enlarged, with a narrowed handle projecting axially from the end of the body. In the usual form, the body of the bell has upwardly converging side walls rounding toward each other at the top or narrow end and flaring outward slightly at the bottom.

In accordance with my invention, the body of the "bell" serves as a container for the cocktail ingredients, and the handle is provided with a longitudinal passage through which the mixed ingredients may be poured. The handle is provided with a removable closure at its outer or free end to seal the passage during the mixing procedure.

In a preferred embodiment, the handle is provided with means for permitting its removable association with the body of the bell. Preferably, the body has an aperture at its upper or narrow end, through which the original ingredients may be introduced into the container; and the handle is removably secured to the body, whereby this aperture is sealed when the handle is applied.

In accordance with my invention, I also prefer to provide a strainer at the inner end of the handle, so that the mixture is strained as it is poured out of the end of the handle. Preferably, this strainer is mounted in a removable manner. In the illustrated embodiment, the strainer is removably associated with the handle itself.

I achieve the foregoing objects, and such other objects as may hereinafter appear or be pointed out, in the manner illustratively exemplified in the accompanying drawing, wherein—

Figure 1 is a perspective view of a cocktail shaker of the present character during the mixing procedure;

Figure 2 is a perspective view showing the manner in which the mixture is poured from the shaker; and Figure 3 is an enlarged cross-sectional elevation.

The container portion of the shaker comprises the bottom wall 10 which is preferably flat and circular and the upwardly converging side walls 11. These side walls flare outwardly near the bottom, and are rounded toward each other at the top, whereby the container simulates the body of a bell of the town-crier variety.

The upper end of the container is preferably thickened, as at 12, and is provided with the central filling aperture 13. The walls of this aperture are, in the illustrated embodiment, provided with the screw threads 14.

I have designated the handle of the shaker by the reference numeral 15. This handle preferably presents an outer grasping surface of heat-insulating material, such as wood; and the reference numeral 15 is applied directly to a tubular element of wood having a contour and shape which simulates a handle for the bell. Extending longitudinally through the wooden element 15 is a metal tube 16 secured in position by the nut 17 and projecting slightly beyond the opposite ends of the wooden element 15. These projecting ends are exteriorly threaded. At the outer end, this projecting threaded portion is adapted to receive a removable closure or cap 18 which is suitably threaded in a complementary manner on its interior. A washer or gasket 19 is preferably employed, although this is not absolutely essential.

Mounted on the lower end of the metal tube 16 is a nut element 20 provided with suitable interior threads to engage with the exterior threads of the tube 16. This element is also provided with a threaded neck 21 adapted to engage with the screw threads 14 of the bell body, thereby permitting the handle as a unit to be removably applied with respect to the container portion of the shaker. A rubber washer or gasket 22 is preferably employed, although this is not absolutely essential.

In accordance with my invention, a strainer 23 is preferably arranged at the lower end of the handle. This strainer, if used at all, is preferably mounted in a removable manner, and I have illustratively shown the strainer 23 in screw-threaded relationship with the nut element 20.

When the device is used, the nut element 20 is first manipulated to unscrew it from the body of the shaker, the handle being temporarily laid aside, and the ingredients to be mixed are introduced into the container through the aperture 13. Cracked ice or ice cubes may also be introduced at the same time. When the concoction has been completed, the handle is screwed into position, bringing the parts into the closed relationship shown in Figure 3. The device is then grasped, as indicated in Figure 1, and swung through the air with the motions that would be used in ringing the bell which the device simulates. After the desired amount of shaking has been accomplished, the device is set down, the closure 18 is removed, and the concoction may then be poured out of the shaker, as indicated in Figure 2.

The cleaning of the device is a relatively simple matter, as will be obvious. Where the strainer 23 is removably secured in position, as in the illustrated embodiment, the cleaning is facilitated.

The present shaker may be made of any selected material, such as metal, glass, or combinations of these and other suitable materials. In the preferred form, the body of the shaker is made of highly polished metal. The nut 20 and the closure 18 may be of similar metallic character. The element 15, while preferably of wood or heat-insulating material, may, if desired, be of metal or of any other selected material. When made of wood or the like, the likelihood of frosting along the handle during the shaking procedure is minimized.

While I have illustrated a construction in which the filling of the container is preferably accomplished through the aperture 13, it will be understood that this particular procedure is not absolutely essential, since the ingredients together with the cracked ice may, if desired, be introduced through the tube 16. In such an event, it may not even be necessary to make the handle removable from the bell body, although the removable association of the handle has proven to be more satisfactory in practice, facilitating the cocktail-mixing operation and the subsequent cleaning of the shaker.

Another way of filling the container would be through the bottom wall 10, in which case this bottom wall would be mounted in a removable manner with respect to the side walls 11. A screw-threaded engagement, either with or without a rubber washer or gasket, would accomplish this purpose.

The particular contour of the bell is also susceptible to variation, and it will be understood that the illustrated construction is offered merely by way of example. The essential feature of the device lies in the fact that the container for the ingredients is in the form of a relatively enlarged bell body, provided with a handle which simulates the handle of the bell.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. A cocktail shaker comprising a container for the ingredients to be mixed, said container having a top wall with a relatively large central filling aperture, the side walls converging upwards to impart to the container a shape like the body of a bell, and a relatively long and narrow pouring member projecting axially from said container and removably secured to the top of the container in sealing relation to said aperture, said member having a relatively narrow longitudinal passage through which the contents of the container may be poured, and a removable closure for the outer end of said passage, said member being graspable as a handle for swinging the container to mix the contents thereof.

2. A cocktail shaker as set forth in claim 1, including a strainer arranged across said filling aperture.

3. A cocktail shaker as set forth in claim 1, said handle member having a grasping surface of heat-insulating material.

4. A cocktail shaker as set forth in claim 1, said handle member having a grasping surface of wood.

5. A cocktail shaker as set forth in claim 1, said top wall adjacent said filling aperture, and said handle member being provided with cooperable screw threads.

6. A cocktail shaker as set forth in claim 1, said container having a relatively wide base to support the cocktail shaker in upright position.

BRUCE DE MONTMORENCY.